Dec. 12, 1933. C. F. VAN BLANKENSTEYN 1,938,878
FASTENER FOR LICENSE PLATES
Filed April 12, 1933
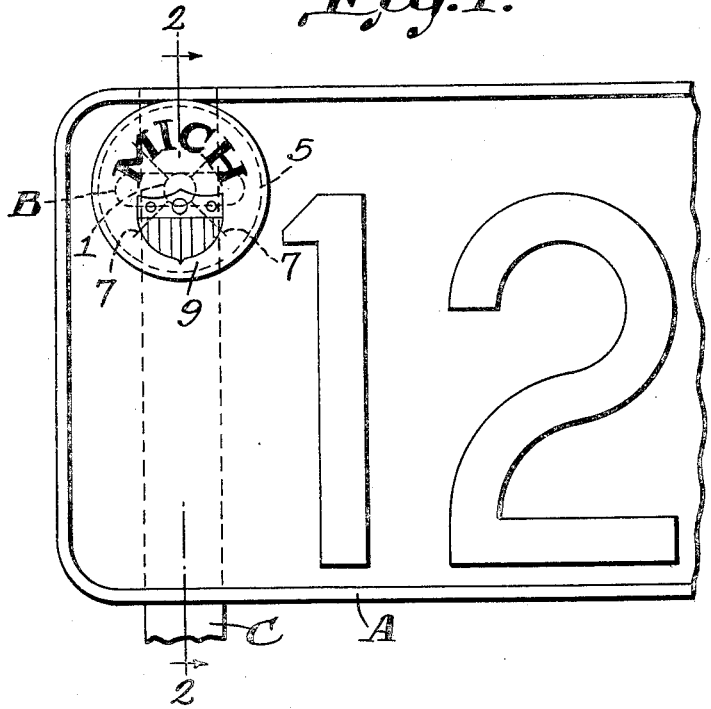
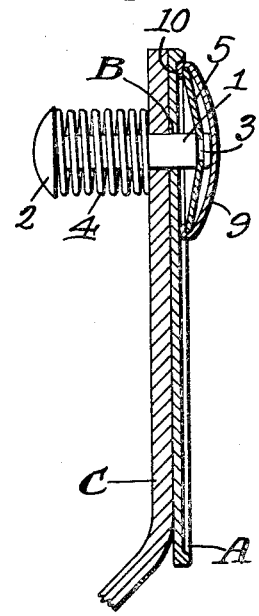
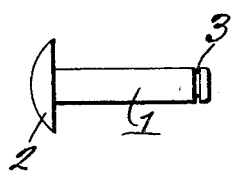
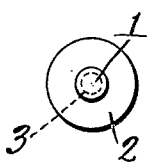
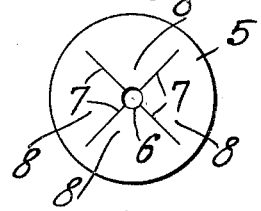
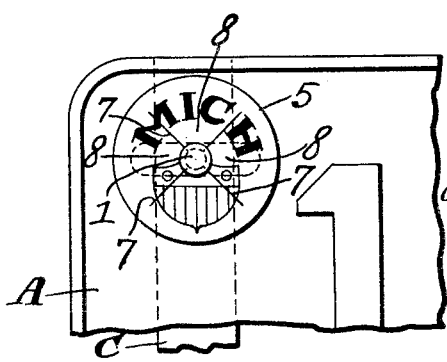
Cornelius Francis Van Blankensteyn
Inventor
By C. A. Snow & Co.
Attorneys.

Patented Dec. 12, 1933

1,938,878

UNITED STATES PATENT OFFICE 1,938,878

FASTENER FOR LICENSE PLATES

Cornelius Francis Van Blankensteyn, East Lansing, Mich.

Application April 12, 1933. Serial No. 665,781

3 Claims. (Cl. 40—125)

This invention relates to a fastener designed primarily for attaching license plates to automobiles.

It frequently happens that license plates are stolen from vehicles and attached to other cars and such substitution has been extremely difficult of detection.

It is an object of the present invention to provide a fastener which will become broken when the secured license plate is removed.

It is a further object to provide a fastener of a distinctive appearance obtainably solely at the time of purchase of the tag, it being apparent that where unauthorized replacements of the fastener are impossible, the substitution of other fasteners having a different appearance would immediately indicate that an unlawful substitution of plates had been effected and would call for an investigation.

A still further object is to provide a fastener which is of simple and inexpensive construction and can be applied readily for the purpose of attaching a plate but, after once being attached, cannot be removed without breakage.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is an elevation of a portion of a license plate secured by means of a fastener constituting the present invention.

Figure 2 is a section on line 2—2, Figure 1.

Figure 3 is a side elevation of the shank member of the fastener.

Figure 4 is an end elevation thereof.

Figure 5 is a front elevation of the button member of the fastener.

Figure 6 is a side elevation thereof.

Figure 7 is a front elevation of a cover which can be used with the button.

Figure 8 is a section therethrough.

Figure 9 is a view showing a license plate fastener without an identifying or shielding cover.

Referring to the figures by characters of reference A designates a license plate having the usual opening B for the reception of a fastener whereby the plate can be attached to a bracket C or the like.

The present invention includes a bolt-like member comprising a shank 1 having a head 2 at one end while an annular groove 3 is formed in the shank near its other end. This shank 1 extends through a coiled spring 4 which can be soldered or otherwise joined at one end to the head 2 so as not to become separated therefrom prior to application to the license plate.

In connection with the shank there is provided a disc or button 5 which is concavo-convex and formed of a frangible material. This button has a central opening 6 the diameter of which is substantally equal to the diameter of that portion of shank 1 surrounded by groove 3. Slits 7 radiate from this opening to points near the margin of the button so that segmental tongues 8 are thus formed which converge toward the opening 6.

The convex surface of the button can bear a distinctive mark readily discernible so that it can be determined easily whether any substitution has been made after the initial placing of the fastener as hereinafter explained. Such an arrangement has been indicated in Figure 9. If preferred, however, the convex surface can be provided with a cap 9 spaced from the opening 6 and formed of a brittle material which will fracture if subjected to unusual strains. This cap can be provided with an inturned edge 10 so that it cannot be removed from the button 8.

Suitable identifying characters or insignia can be displaced on the outer surface of this cap.

In practice the license plate is positioned on its brackets in the usual way but instead of inserting a bolt such as commonly employed, the shank 1 is directed through the bracket C and the opening B from the back thereof, hereby placing spring 4 under compression. With the parts thus arranged the concave surface of button 5 is placed over the end of the shank so that the opening 6 can be spread slightly to allow tongues 8 to snap into groove 6. The material of the button can be such as to permit this slight resiliency. However should any attempt be made to pry the button off of the shank, said button, as well as its cover 9, being formed of brittle material, would become fractured and rendered unfit for further use.

As it is designed to furnish these buttons only at the time of sale of the license plates and new buttons cannot be obtained unless satisfactory explanations are furnished, it will be apparent that should a license plate be stolen and applied to another vehicle, the use of fastening means not equipped with the official identifying buttons would lead to ready detection and consequent investigation.

By providing the spring 4, the disc or button will be clamped firmly against the secured license plate and the fastener can be adapted for use with different thicknesses of materials. This also prevents the parts from rattling.

What is claimed is:

1. The combination with a supporting bracket or the like, and an apertured license plate bearing thereagainst, of means for fastening the plate to the bracket, including a bolt-like device extending through the bracket and the apertured plate and including a shank with an annular groove adjacent one end and a head at its other end, a disc of brittle material adapted to be forced onto the shank and having integral means for snapping into the groove to lock the disc to the shank and prevent its removal without fracture, a spring mounted on the shank between the bracket and head and secured at one end to the head, the other end of the plate bearing against the bracket to bind the disc upon the plate and the plate against the bracket.

2. The combination with a supporting bracket or the like, and an apertured license plate bearing thereagainst, of means for fastening the plate to the bracket, including a bolt-like device extending through the bracket and the apertured plate and including a shank with an annular groove adjacent one end and a head at its other end, a disc of brittle material adapted to be forced onto the shank and having integral means for snapping into the groove to lock the disc to the shank and prevent its removal without fracture, a spring mounted on the shank between the bracket and head and secured at one end to the head, the other end of the plate bearing against the bracket to bind the disc upon the plate and the plate against the bracket, and a frangible cap fixedly mounted on the disc and substantially coextensive therewith for concealing the disc and shank.

3. A fastener for license plates and the like including a bolt-like member having a shank with an annular groove at one end and a head at its other end, a concavo-convex disc of brittle material having an opening with slits radiating therefrom to provide tongues capable of flexing slightly, said disc being movable onto the shank to snap the tongues into the groove, and a frangible cap concealing the disc and the end of the engaged shank, said cap being distinctively marked and substantially coextensive with the disc.

CORNELIUS FRANCIS VAN BLANKENSTEYN.